United States Patent Office 3,749,657
Patented July 31, 1973

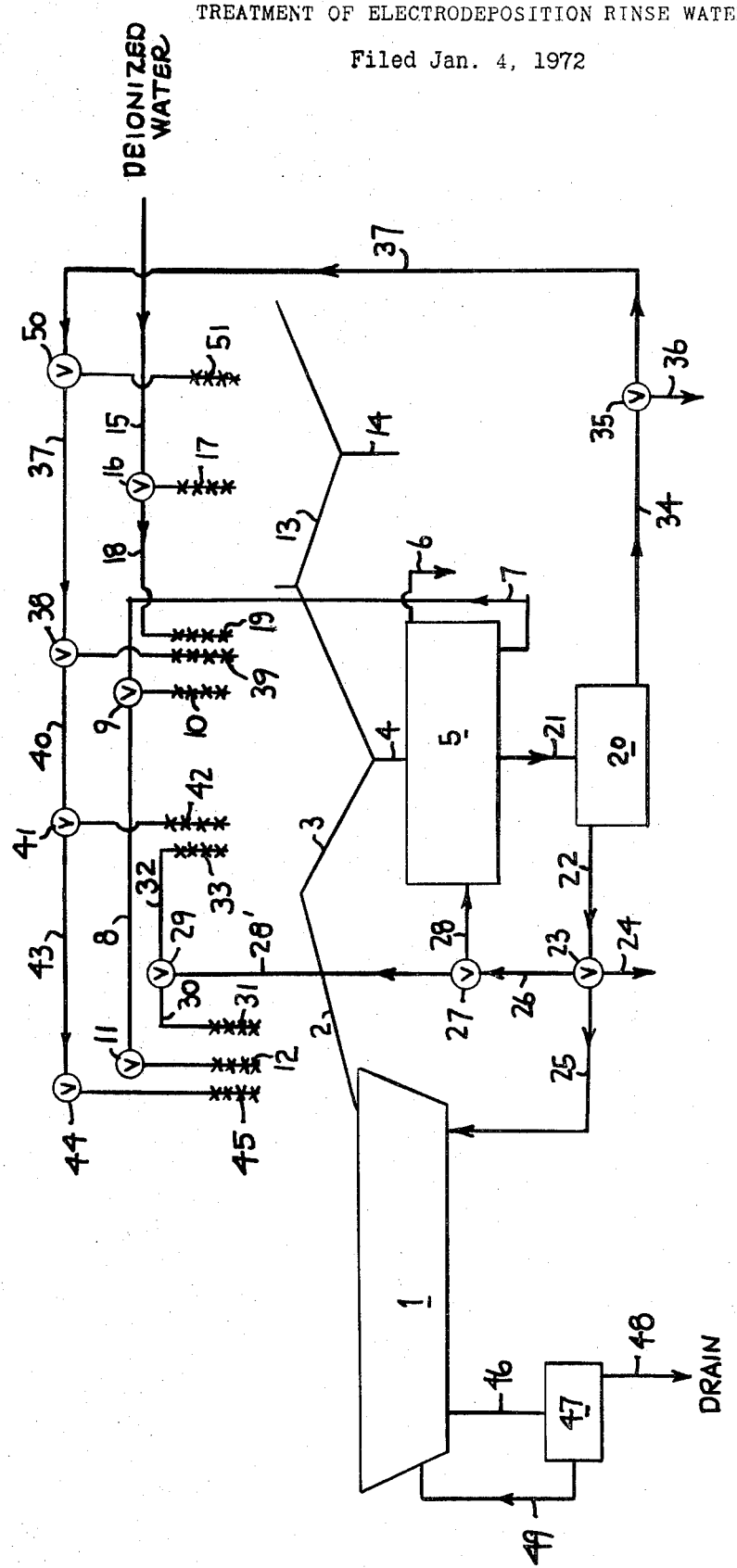

---

3,749,657
TREATMENT OF ELECTRODEPOSITION RINSE WATER
Louis R. Le Bras and Roger M. Christenson, Gibsonia, and Robert R. Zwack, New Kensington, Pa., assignors to PPG Industries, Inc., Pittsburgh, Pa.
Continuation-in-part of application Ser. No. 71,798, Sept. 14, 1970, which is a continuation-in-part of application Ser. No. 886,004, Dec. 17, 1969, both now abandoned. This application Jan. 4, 1972, Ser. No. 207,701
Int. Cl. B01k 5/02; C23b 13/00
U.S. Cl. 204—181                    25 Claims

ABSTRACT OF THE DISCLOSURE

This invention relates to a method of treating electrodeposition rinse water by removing at least a portion of the solids contained therein. The process of the invention comprises subjecting electrodeposition rinse water to ultrafiltration. The solids which are concentrated by the process, if desired, may be returned to the electrodeposition bath directly or indirectly, while the ultrafiltrate may be used as a rinsing agent.

Cross-references to related applications

This application is a continuation-in-part of application Ser. No. 71,798, filed Sept. 14, 1970, which in turn is a continuation-in-part of application Ser. No. 886,004, filed Dec. 17, 1969, both now abandoned.

State of the Art

Electrodeposition has become a widely commercially-accepted industrial coating technique. The coatings achieved have excellent properties for many applications and electrodeposition results in a coating which does not run or wash off during baking. Virtually any conductive substrate may be coated by electrodeposition. Those normally employed are metal substrates, including metals such as iron, steel, copper, zinc, brass, tin, nickel chromium, or aluminum, as well as other metals or pretreated metals. Impregnated paper and other substances rendered conductive under the conditions of the coating process may also be employed substrates.

In the electrodeposition process, articles to be electrocoated are immersed in an aqueous dispersion of solubilized, ionized, film-forming materials such as synthetic organic vehicle resins. An electric current is passed between the article to be coated, serving as an electrode, and a counterelectrode to cause deposition of a coating of the vehicle resin on the article. The article is then withdrawn from the bath and usually rinsed and the coating is either air-dried or baked in the manner of a conventional finish.

The rinse water obtained in the electrodeposition process represents an economic loss of coating materials and a waste disposal problem. The economic loss is occasioned by the fact that when the article is coated and is being withdrawn from the coating bath, a portion of the coating material which is not electrocoated on the article but merely adherent thereto or trapped by the configuration of article and is withdrawn with the article. This material is commonly called "dragout." The purpose of the rinse water is to remove this dragout, leaving an adherent electrocoated film. This dragout, which is essentially a portion of the bath composition, when rinsed from the article represents waste material and reduces the efficiency of the system. Further, the rinse water containing the dragout comprises a waste disposal problem since many of the materials contained in this rinse water are undesirable in drain lines and are either unlawful under sewage codes or cause stream pollution or other disposal problems.

Description of the invention

It has now been found that electrodeposition rinse water may be treated by a selective separation process comprising a separation through a physical barrier such as a membrane or filter in an ultrafiltration process; thereby removing or concentrating the solids which may either be disposed of or returned directly or indirectly to the electrodeposition bath. The resultant filtrate or effluent, in turn, may be returned directly to the electrodeposition bath, if desired, or more usually may be employed as a rinsing agent, either as such or in admixture with or in combination with conventional rinsing media such as deionized water, tap water, or any other source of water usable as rinse water. The rinsing may be conducted in such a way that at least a portion of the rinse water containing solids is returned to the electrodeposition bath. If desired, the filtrate or effluent may be treated as waste and disposed of in an appropriate manner.

It has been noted that the rinse water containing dragout is frequently deficient with respect to solubilizing agent. This can be explained by the fact that the resin being electrodeposited migrates toward the electrode being coated. When the resin is coated, it gives up the solubilizer counter-ion which migrates toward the counter-electrode. There is frequently an area created immediately surrounding the electrode being coated which is richer in resin and poorer in solubilizing counter-ion than the remainder of the electrodeposition bath. Thus, the dragout frequently tends to be solubilizing agent deficient.

Before treating the dragout-containing rinse water by the process herein described, it is desirable when the rinse water is in an unsatisfactory pH condition or in an unstable condition due to a deficiency in solubilizing agent to add sufficient solubilizing agent, e.g., in the case of a polyacid resin a base such as an amine or alkali metal hydroxide such as potassium hydroxide, in order to adjust the pH of the rinse water to the point where the solubilized resin is in a stable form, that is, so that it does not precipitate or agglomerate, especially when concentrated It is usually desirable to add the solubilizing agent which is present in the electrodeposition bath, especially if the concentrated solids are to be returned to the electrodeposition bath, although any solubilizing agent may be employed. Generally, in the case of polyacid resins, it is preferred to process rinse water having a pH of at least 6 and usually at least 7.5. Obviously, the optimum pH depends on the nature of the resin and optimum pH of the electrodeposition bath.

Ultrafiltration of an aqueous media containing electrodepositable solids has been charged in copending application Ser. No. 814,789, now abandoned, wherein the ultrafiltration process is taught to be a means of controlling an electro-deposition bath composition and a method of removing objectionable accumulated materials through the use of a selective filtration process, that is, a process which selectively removes low molecular weight materials from the bath composition. This selective filtration process removes excess counter-ions and thus serves as a method of conventional bath control, but in addition this method further removes other excess materials or contaminants from the bath, thus permitting more complete control over bath constituents than has heretofore been possible.

It has now been found that the same ultrafiltration technique when applied to electrodeposition rinse water, which is generally of appreciably lower solids than electrodeposition bath material, is a method of concentrating the solids to a usable level or producing as filtrate water with low suspended solids levels. Substantially higher flux rates are typically obtained when ultrafiltering low solids materials as opposed to the electrodeposition bath.

The process is an ultrafiltration process which separates materials below a given molecular weight size from the electrodeposition rinse water. With properly selected membranes, this treatment concentrates the electrodepositable components in the rinse water but does not pass anionic, cationic and non-ionic materials with water in a ratio proportional to their concentration in the rinse water. Thus, for example, it typically passes excess amines, alkaline metal ions, phosphates, chromates, sulfates, solvents and dissolved carbon dioxide, among others.

Ultrafiltration may be defined as a method of concentrating solute while removing solvent, or selectively removing solvent and low molecular weight solute from a significantly higher molecular weight solute. From another aspect, it is a process of separation whereby a solution containing a solute of molecular dimensions significantly greater than the solvent is depleted of solute by being forced under a hydraulic pressure gradient to flow through a suitable membrane. The first definition is the one which most fittingly describes the term "ultrafiltration" as applied to an electrodeposition bath.

Ultrafiltration thus encompasses all membrane-moderated, pressure-activated separations wherein solvent or solvent and smaller molecules are separated from modest molecular weight macromolecules and colloids. The term "ultrafiltration" is generally broadly limited to describing separations involving solutes of molecular dimensions greater than above the solvent molecular diameters and below the limit of resolution of the optical microscope, that is, about 0.5 micron. In the present process, water is considered the solvent.

The principles of ultrafiltration and filters are discussed in a chapter entitled "Ultrafiltration" in the Spring, 1968, volume of Advances in Separations and Purifications, E. S. Perry, Editor, John Wiley & Sons, New York, as well as in Chemical Engineering Progress, vol. 64, December 1968, pp. 31 through 43, which are hereby incorporated by reference.

The basic ultrafiltration process is relatively simple. Solution to be ultrafiltered is confined under pressure, utilizing, for example, either a compressed gas or liquid pump in a cell, in contact with appropriate filtration membrane supported on a porous support. Any membrane or filter having chemical integrity to the system being separated and having the desired separation characteristic may be employed. Preferably, the contents of the cell should be subjected to at least moderate agitation to avoid accumulation of the retained solute on the membrane surface with the attendant binding of the membrane. Ultrafiltrate is continually produced and collected until the retained solute concentration in the cell solution reaches the desired level, or the desired amount of solvent or solvent plus dissolved low molecular weight solute is removed. A suitable apparatus for conducting ultrafiltration is described in U.S. Pat. No. 3,494,465, which is hereby incorporated by reference.

There are two types of ultrafiltration membrane. One is the microporous ultrafilter, which is a filter in the traditional sense, that is, a rigid, highly-voided structure containing interconnected random pores of extremely small average size. Through such a structure, solvent (in the case of electrodeposition, water) flows essentially viscously under a hydraulic pressure gradient, the flow rate proportional to the pressure difference, dissolved solutes, to the extent that their hydrated molecule dimensions are smaller than the smallest pores within the structure, will pass through, little impeded by the matrix. Larger size molecules, on the other hand, will become trapped therein or upon the external surface of the membrane and will thereby be retained. Since the microporous ultrafilters are inherently susceptible to internal plugging or fouling by solute molecules whole dimensions lie within the pore size distribution of the filter, it is preferred to employ for a specific solute a microporous ultrafilter whose mean pore size is significantly smaller than the dimensions of the solute particle being retained.

In contrast, the diffusive ultrafilter is a gel membrane through which both solvent and solutes are transported by molecular diffusion under the action of a concentration or activity gradient. In such a structure, solute and solvent migration occurs via random thermal movements of molecules within and between the chain segments comprising the polymer network. Membranes prepared from highly hydrophilic polymers which swell to eliminate standard water are the most useful diffusive aqueous ultrafiltration membranes. Since a diffusive ultrafilter contains no pores in the conventional sense and since concentration within the membrane of any solute retained by the membrane is low and time-independent, such a filter is not plugged by retained solute, that is, there is no decline in solvent permeability with time at a constant pressure. This property is particularly important for a continuous concentration or separation operation. Both types of filters are known in the art.

The presently preferred ultrafilter is an anisotropic membrane structure. This structure consists of an extremely thin, about one-tenth to about ten micron layer, of a homogeneous polymer supported upon a thicker layer of a microporous open-celled sponge, that is, a layer of about 20 microns to about 1 millimeter, although this dimension is not critical. If desired, this membrane can be further supported by a fibrous sheet, for example, paper, to provide greater strength and durability. These membranes are used with a thin film or skin side exposed to the high pressure solution. The support provided to the skin by the spongy substrate is adequate to prevent film rupture.

Membranes useful in the process are items of commerce and can be obtained by several methods. One general method is described in Belgian Pat. No. 721,058. This patent describes a process which, in summary, comprises (a) forming a casting dope of the polymer in an organic solvent, (b) forming a film of the casting dope, and (c) preferentially contacting one side of said film with a diluent having high compatibility with the casting dope to effect precipitation of the polymer immediately upon coating the cast film with the diluent.

The choice of a specific chemical composition for the membrane is determined to a large extent by its resistance to the chemical environment. Membranes can be typically prepared from thermoplastic polymers such as polyvinyl chloride, polyacrylonitrile, polysulfones, poly(methyl methacrylate), polycarbonates, poly(n-butyl methacrylate) nylons, as well as large groups of copolymers formed from any of the monomeric units of the above polymers, including "Polymer 360," a polysulfone copolymer. Cellulosic materials such as cellulose acetate may also be employed as membrane polymers.

Some examples of specific anisotropic membranes operable in the process of the invention include: Diaflow membrane ultrafilter PM 30, the membrane chemical composition of which is a polysulfone copolymer, Polymer 360, and which has the following permeability characteristics:

SOLUTE RETENTION CHARACTERISTICS

| Solute | Molecular weight | Percent retention |
|---|---|---|
| Bacitracin | 1,400 | 0 |
| Cytochrome C | 14,500 | 0 |
| Pepsin | 35,000 | 100 |
| Albumin | 67,000 | 100 |
| Dextran 110 | 110,000 | 60 |

| | | Flow rate—ml./min. | | |
|---|---|---|---|---|
| Membrane diameter | Pressure, p.s.i. | Distilled water | 0.25% Cytochrome C (~12,400 m.w.) in distilled water | 0.25% Pepsin (~35,000 m.w.) in distilled water |
| 25 mm | 50 | 15 | 0.5 | 1.5 |
| 150 mm | 50 | 600 | 24.0 | 80.0 |

The membrane is chemically resistant to acids ($HCl$, $H_2SO_4$, $H_3PO_4$, all concentrates), alkalis, high phosphate buffer and solutions of common salts as well as concentrated urea and guanadine hydrochloride. The membrane is solvent-resistant to alcohol acetone and dioxane. The membrane is not solvent-resistant to dimethylformamide or dimethyl sulfoxide. This membrane is hereinafter referred to as "Membrane A."

Dorr-Oliver XPA membrane, the membrane chemical composition of which is Dynel (an acrylonitrile-vinyl chloride compolymer) and which has the following permeability characteristics:

| Solute | Molecular weight | Percent retention | Flux (gal./sq. ft./day at 30 p.s.i., 1.0% solute) |
|---|---|---|---|
| Cytochrom C | 12,600 | 50 | 100 |
| α Chymotripsinagen | 24,000 | 90 | 22 |
| O valbumin | 45,000 | 100 | 45 |

This membrane is hereinafter referred to as Membrane B."

Dorr-Oliver BPA type membrane, the membrane chemical composition of which is phenoxy resin (polyhydroxy ether) and which has the following permeability characteristics:

| Solute | Molecular weight | Percent retention | Flux (gal./sq. ft./day at 30 p.s.i., 1.0% solute) |
|---|---|---|---|
| Cytochrom C | 12,600 | 50 | 30 |

This membrane is hereinafter refered to as "Membrane C."

The microporous ultrafilters are generally isotropic structures, thus flow and retention properties are independent of flow direction. It is preferred to use an ultrafilter which is anisotropic in its microporous membrane structure. In such a membrane, the pore size increases rapidly from one face to the other. When the fine textured side is used in contact with the feed solution, this filter is less susceptible to plugging since a particle which penetrates the topmost layer cannot become trapped in the membrane because of the larger pore size in the substrate.

The process of the invention may be operated as either a batch or a continuous process. In batch selective filtration or batch ultrafiltration a finite amount of material is placed in a cell which is pressurized. A solvent and lower molecular weight solutes are passed through the membrane. Agitation is provided by a stirrer, for example, a magnetic stirrer. Obviously, this system is best used for small batches of material. In a process requiring continuous separation, a continuous selective filtration process is preferred. Using this technique, material is continuously recirculated under pressure against a membrane or series of membranes through interconnecting flow channels, for example, spiral flow channels.

Likewise, the ultrafiltration process may be conducted as either a concentration process or a diafiltration process. Concentration involves removing solvent and low molecular weight solute from an increasingly concentrated retenate. Filtration flow rate will decrease as the viscosity of the concentrate increases. Diafiltration, on the other hand is a constant volume process whereby the starting material is connected to a reservoir of pure solvent, both of which are placed under pressure simultaneously. Once filtration begins, the pressure source is shut off in the filtration cell and, thus, as the filtrate is removed, an equal volume of new solvent is introduced into the filtration cell to maintain the pressure balance.

Under ideal conditions, selected low molecular weight solutes would be filtered as readily as solvent and their concentration in the filtrate is equal to that in the retentate. Thus, for example, if a material is concentrated to equal volumes of filtrate and retentate, the concentration of low molecular weight solute in each would be the same.

Using diafiltration, retentate solute concentration is not constant and the mathematical relationship is as follows:

$$\ln \frac{C_{io}}{C_i} = \frac{V_s}{V_o}$$

where $C_{io}$ is the initial solute concentration, $C_i$ is the final solute concentration of the retentate, $V_s$ is the volume of solute delivered to the cell (or the volume of the filtrate collected), and $V_o$ is the initial solution volume (which remains constant).

Electrodepositable compositions, while referred to as "solubilized," in fact are considered a complex solution, dispersion or suspension or combination of one or more of these classes in water, which acts as an electrolyte under the influence of an electric current. While, no doubt, in some circumstances the vehicle resin is in solution, it is clear that in some instances and perhaps in most the vehicle resin is a dispersion which may be called a molecular dispersion of molecular size between a colloidal suspension and a true solution.

The typical industrial electrodepositable composition also contains pigments, crosslinking resins and other adjuvants which are frequently combined with the vehicle resin in a chemical and a physical relationship. For example, the pigments are usually ground in a resin medium and are thus "wetted" with the vehicle resin. As can be readily appreciated then, an electrodepositable composition is complex in terms of the freedom or availability with respect to removal of a component or in terms of the apparent molecular size of a given vehicle component.

As applied to the process of this invention, ultrafiltration comprises subjecting electrodeposition rinse water composition which contains dragout comprising the components of the electrodepositable composition which inherently contains contaminants and other low molecular weight materials accumulated in the bath, such as metal pre-treatment chemicals, water, absorbed $CO_2$ (either dissolved or, more likely, combined as an aminic salt or carbonate), neutralizing agent, organic solvent and ions such as chromate, phosphate, chloride and sulfate, for example, to an ultrafiltration process employing an ultrafilter, preferably a diffusive membrane ultrafilter selected to retain the solubilized vehicle resin while passing water and low molecular weight solute, especially those with a molecular weight below about 1000 and preferably below about 500. As previously indicated, the filters discriminate as to molecular size rather than actual molecular weight, thus, these molecule weights merely establish an order of magnitude rather than a distinct molecular weight cut-off. Likewise, as previously indicated, the retained solutes may, in fact, be colloidal dispersions or molecular dispersions rather than true solutes.

In practice, a portion of rinse water containing dragout comprising a portion of the electrodepositable composition may be continuously or intermittently removed from a receiver and passed under pressure created by a pressurized gas or by means of pressure applied to the contained fluid in contact with the ultrafilter. Obviously, if desired, the egress side of the filter may be maintained at a reduced pressure to create the pressure difference.

The pressures necessary are not severe. The maximum pressure, in part, depends on the strength of the filter. The minimum pressure is that pressure required to force an effluent comprising water and lower molecular weight solute through the filter at a measurable rate. With the presently preferred membranes, the operating pressures are between about 10 and about 150 p.s.i., preferably between about 25 and about 75 p.s.i. Under most circumstances, the ultrafilter should have an initial flux rate, measured with the composition to be treated, of at least about 10 gallons/sq. ft./day (24 hours) and preferably at least about 15 gallons/sq. foot/day.

As previously indicated, rinse water should be in motion at the face of the filter to prevent the retained solute from impeding the flow through the filter. This may be accomplished by mechanized stirring or by fluid flow with a force vector parallel to the filter surface.

The retained solutes comprising the vehicle resin are then returned to the electrodeposition bath, directly or indirectly.

If there is present in the bath desirable materials which, because of their molecular size, are removed in the ultrafiltration process, these may likewise be returned to the bath either directly to the retained solute before entry to the bath, in the makeup feed as required, or independently.

A number of electrodepositable resins are known and can be employed to provide the electrodepositable compositions which may be utilized in the process to which this invention relates. Virtually any water-soluble, water-dispersible or water-emulsifiable polyacid or polybasic resinous material can be electrodeposited and, if film-forming, provides coatings which may be suitable for certain purposes. Any such electrodepositable composition is included among those which can be employed in the present invention, even though the coating obtained might not be entirely satisfactory for certain specialized used.

Presently, the most widely used electrodeposition vehicle resins are synthetic polycarboxylic acid resinous materials. Numerous such resins are described in U.S. Pats. Nos. 3,441,489; 3,422,044; 3,403,088; 3,369,983 and 3,366,563, which are incorporated by reference. These include a reaction product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed.

Also included among such esters are those in which the esters themselves are modified with other acids, including saturated, unsaturated or aromatic acids or an anhydride thereof. The acid-modified esters are made by trans-esterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using the other polyols such as trimethylolpropane, pentaerythritol, sorbitol and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the term "drying oil fatty acid esters" as set forth herein are alkyd resins prepared utilizing semi-drying or drying oils; esters of epoxides with such fatty acids, including esters of diglycidyl ethers of polyhydric compounds as well as other mono-, di- and polyepoxides, semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers or unsaturated aliphatic alcohols, e.g., allyl alcohol or methallyl alcohol, including copolymers of such alcohols with styrene or other ethylenically unsaturated monomers or with non-oil modified alkyl resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of the above acids or anhydrides may also be utilized. Generally speaking, the anhydride or acid employed contains from 4 to 12 carbon atoms, although longer chain compounds can be used if so desired.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics.

As shown in the art, it is preferred that in certain instances the neutralization reaction be carried out in such a manner that amido groups are attached to part of the carbonyl carbon atoms derived from the dicarboxylic acid or anhydride.

Compositions within this general class are described in U.S. Pats. Nos. 3,366,563 and 3,369,983.

Another vehicle comprises the fatty acid ester, unsaturated acid or anhydride reaction products and any additional unsaturated modifying materials (as described above) which are further reacted with the polyol.

Essentially any polyol can be employed, but diols are preferred. When higher polyols, such as trimethylolpropane, glycerol, pentaerythritol or the like are utilized, they are employed in small amounts, or in conjunction with the diol, or in the presence of a monohydric alcohol, and are used with adducts having a relatively low proportion of acidic component. Water-insoluble diols are often preferable, and especially desirable water-dispersed compositions for electrodeposition are obtained using 2,2-bis(4-hydroxycyclohexyl)-propane (which has given the best results), neopentyl glycol, 1,1'-isopropylidene-bis(p-phenyleneoxy) di-e-propanol, and similar diols.

The proportions of the polyol and ester-anhydride adduct which are employed depend upon various factors, but are in general limited only by the need to avoid gelation of the product. The total functionality of the reactants is a guide to determining the optimum proportions to be employed, and in most instances should not be greater than about 2.

In many instances, only part of the anhydride groups of the adduct, e.g., about 10 percent, are reacted with the polyol. Of those anhydride groups reacted, it is preferred that only one of the carboxyl groups is esterified in each instance.

The product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially-esterified product with a base.

The polyol reaction products and reaction conditions are more fully described in U.S. Pat. No. 3,565,781, as well as in the art cited above.

Another type of electrodepositable coating composition which gives desirable results are the water-dispersible coating compositions comprising at least partially neutralized interpolymers of hydroxyalkyl esters of unsaturated carboxylic acids, unsaturated carboxylic acids and at least one another ethylenically unsaturated monomer.

These are employed in the composition along with an amine-aldehyde condensation product, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about one percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene, but others can be utilized.

The above interpolymer is at least partially neutralized by reaction with a base as described above; at least about 10 percent, and preferably 50 percent or more if the acidic groups are neutralized, and this can be carried out either before or after the incorporation of the interpolymer in the coating composition.

The amine-aldehyde condensation products included in these compositions are, for example, condensation products of melamine, benzoguanamine, or urea, with formaldehyde, although other amine-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent-soluble.

Electrodeposition compositions comprising the above interpolymers and an amine-aldehyde resin are more fully described in U.S. Pat. No. 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface-active agent, such as a polyalkylene glycol (e.g., "Carbowax"), is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis-(methoxymethyl) melamine.

The alkyd-amine compositions are dispersed in water and they ordinarily contain from about 10 percent to about 50 percent by weight of amine resin based on the total resinous components.

Yet another electrodepositable composition of desirable properties comprises mixed esters of a resinous polyol. These resin esters comprise mixed esters of an unsaturated fatty acid adduct. Generally the polyols which are utilized with these resins are essentially any polyol having a molecular weight between about 500 and 5000. Such resinous polyols include those resinous materials oxirane rings which can be opened in, prior to, or during the esterification reaction to provide an apparent hydroxy site. The vehicle resins are formed by reacting a portion of the hydroxyl groups of the polyol with the fatty acid, the ratio of the reactions being such that at least an average of one hydroxyl group per molecule of the polyol remains unreacted. The remaining functionality is the reacted with the unsaturated fatty acid adduct of an olefinically unsaturated dicarboxylic anhydride, such as maleic anhydride, this second esterification reaction being conduced under conditions so that esterification occurs through the anhydride ring, thereby introducing free acid groups into the molecule. Mixed acids of the class described are disclosed in Belgian Pat. No. 641,642, as well as copending application Ser. No. 568,144, filed July 27, 1966, now abandoned.

In order to produce an electrodepositable composition, it is necessary to at least partially neutralize the acid groups present with a base in order to disperse the resin in the electrodeposition bath. Inorganic basis such as metal hydroxides, especially potassium hydroxide, can be used. There may likewise be used ammonia or organic bases, especially water-soluble amines, such as, for example, the mono-, di- and tri-lower alkyl amines such as methylamine, ethylamine, propylamine, butylamine, dimethylamine, diethylamine, dipropylamine, dibutylamine, and m-methylbutylamine, triethylamine, tributylamine, methyldiethylamine, dimethylbutylamine, and the like; cyclic amines such as morpholine, pyrrolidine, piperidine; diamines such as hydrizine, methylhydrazine, 2,3-toluene diamine, ethyl diamine and piperizine and substituted amines such as hydroxylamine, ethanolamine, diethanolamine, butanolamine, hexanolamine and methyldiethanolamine, octanolamine, diglycolamine and other polyglycol amines, triethanolamine, and methylethanolamine, n-amino-ethanolamine and methyldiethanolamine and polyamines such as diethylene triamines.

There may be present in the electrodepositable composition any of the conventional types of pigments employed in the art. There is often incorporated into the pigment composition a dispersing or surface-active agent. Usually the pigment or surface-active agent, if any, are ground together in a portion of the vehicle, or alone, to make a paste and this is blended with the vehicle to produce a coating composition.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methoxy-4-methyl-pentanone-2-(Pent-Oxone).

There may also be included in the coating composition, if desired, additives such as antioxidants. For example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxypolyethylene alkanols, or phosphate esters including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process inoperative, these cations may result in variations of properties of the baths when used in electrodeposition. Thus, in common practice, deionized water, i.e., water from which free ions have been removed by the passage through ion exchange resins, is invariably used to make up coating compositions of the instant invention.

In addition to the electrodepositable vehicle resins described above, there may be present in the electrodepositable composition other resinous materials which are non-carboxylic acid materials. For example, as shown above, there may be added up to about 50 percent by weight of an amine-aldehyde condensation product.

Other base-solubilized polyacids which may be employed as electrodeposition vehicles include those taught in U.S. Pat. No. 3,392,165, which is incorporated herein by reference, wherein the acid groups rather than being solely polycarboxylic acid groups contain mineral acid groups such as phosphonic, sulfonic, sulfate and phosphate groups.

The process of the instant invention is equally applicable to cationic type vehicle resins, that is, polybases solubilized by means of an acid, for example, an amine-terminated polyamide or an acrylic polymer solubilized with acetic acid. Another case of such cationic polymers is described in copending application Ser. No. 772,366, filed Oct. 28, 1968, now abandoned.

In a manner similar to the anionic resins described above, the cationic resins may be formulated with adjuvants, such as pigments, solvents, surfactants, crosslinking resins, and the like.

The polyacids are anionic in nature and are dispersed or dissolved in water with alkaline materials such as amines or alkaline metal hydroxides and, when subjected to an electric current, they migrate to the anode. The polybasic resins, solubilized by acids, are cationic in character and when these resins are water-dispersed or solubilized with an acid such as acetic acid, the material deposits on the cathode under an electric current.

The use of the technique herein described is highly flexible. In the attached drawing, apparatus used to carry out the method of this invention is schematically illustrated. The electrodeposition bath 1 from which films are deposited uses suitable apparatus (not shown). When an article which has been electrocated is rinsed, rinse media (usually water or water with an adjusted pH is in the initial startup) containing dragout is collected, for example, in a holding tank or receiver 5 after having been collected in draw area 3 and passing through line 4.

Rinsing water tank 5 containing dragout may be used in a recirculating rinse system when the rinse contained in the tank 5 is pumped through line 7 to valve 9 to rinsing heads 10, the rinse being collected in drain area 3, returning through line 4 to tank 5. Alternatively, the rinse water contained in tank 5 can be directed through valve 9 proportionally and unidirectionally through line 8 and valve 11 to rinsing heads 12 to conduct rinsing of an article in a manner that the resultant rinse water is returned to the electrodeposition bath 1, being collected by drain area 2. In this manner, at least a portion of the solids contained in tank 5, in some cases containing retentate, are returned to the electrodeposition bath 1.

In accordance with the invention described herein, a portion of the dragout-containing rinse water contained in tank 5 is directed through line 21 to an ultrafilter which generates effluent or ultrafiltrate stream 34 and a retentate or concentrate stream containing solids derived from the electrodepositable composition as dragout.

The retentate stream 22 can be utilized in various ways. The retentate stream 22 can be directed by valve 23 unidirectionally or proportionately to drain 24, through line 25 to the electrodeposition bath 1, or through line 26 to valve 27, where it can be directed through line 28 to the holding tank 5. The retentate stream may also be directed through line 28' to valve 29 where it may be directed unidirectionally or proportionally through line 30 to rinsing heads 31 for rinsing with return to the electrodeposition bath or through line 32 to rinsing heads 33 for rinsing with return to holding tank 5.

The ultrafiltrate or effluent stream can also be utilized in various ways. The ultrafiltrate may, for example, be directed by valve 35 unidirectionally or proportionally to drain 36 or through line 37, lines 37 and 40, or lines 37, 40 and 43 with appropriate setting of valves 50, 38, 41 and 44, to various rinse stations, e.g., rinse station 51, where subsequent no-return rinsing is conducted; rinse station 39 or 42 where rinsing is conducted alone or in conjunction with other rinsing media described herein, with return to holding tank 5; or rinse station 45 where rinsing is conducted with return to the electrodeposition bath.

In conjunction with the process of the invention, if desired, deionized water may be utilized through line 15, valve 16 and rinse station 17 for a final no-return rinse and/or through line valve 16 and line 18 to rinse station 19 for rinsing with return to rinse holding tank 5. It is noted that rinse holding tank 5 is equipped with vent or overflow to drain 6, which can be operated as desired.

Further, in conjunction with the process of the invention, if desired, an ultrafilter 47 may be operated on electrodeposition bath 1, withdrawing a stream 46 from the bath and producing a retentate which is returned via line 49 to the bath and an ultrafiltrate, which is conducted to drain 48, in order to maintain composition control of the bath 1 in cooperation with the remainder of the system.

As previously stated, the drawing is schematic only and does not purport to set forth all the necessary apparatus, pumping means, etc., necessary to operate the process of this invention, since such apparatus and means are known to those skilled in the art.

Various other operative combinations are possible within the scope of the invention and the drawing is not inclusive of all possible combinations.

The invention is further described in conjunction with the following examples, which are to be considered illustrative rather than limiting. All parts and percentages in the examples and throughout the specification are by weight unless otherwise stated.

EXAMPLE I

The vehicle resin in this example is a maleinized tall oil fatty acid-adipic acid ester of a styrene-allyl alcohol copolymer of 1100 molecular weight and 5 hydroxyl functionality comprising 39.8 percent of the copolymer, 52.9 percent tall oil fatty acids, 1.3 percent adipic acid, and 6.0 percent maleic anhydride as a 90 percent solution in 4-methoxy-4-methyl pentanone-2 having an intrinsic viscosity of 31,500 centipoises and an acid value of 41.

The electrodepositable material had the following composition:

| | Percent | |
|---|---|---|
| Non-volatiles | | 100 |
| Vehicle non-volatiles | | 86.05 |
| 20 percent maleinized linseed oil | 5.05 | |
| Vehicle resin | 85.44 | |
| Alkylether of methylolated phenol (Methylon 75108) | 8.38 | |
| Cresylic acid | 0.88 | |
| Surfactant (Witco 912) | 0.25 | |
| Pigment | | 13.95 |
| Lead silicate | 4.15 | |
| Manganese dioxide | 8.03 | |
| Anthracite coal | 83.40 | |
| Strontium chromate | 4.15 | |
| Solubilizing amine | ¼ diethyl/triethylamine | |

The composition was reduced to 12 percent solids with deionized water. The solvent comprised 2.6 percent of the total composition.

Steel parts electrocoated from this bath were rinsed with deionized water and the water containing dragout was collected. This rinse water was subjected to a batch selective filtration utilizing a Diaflow Ultrafilter (PM 30) described above as Membrane A.

The filter passed ultrafiltrate and retained the coating solids. However, the pigment tended to flocculate and settle when subjected to agitation.

An additional portion of rinse water was treated with triethylamine (0.5 part per 400 parts of rinse water), the pH rising to 10.1 and the conductivity at 75° F. rising from 330 to 600 mmhos/cm.

This rinse water was subjected to ultrafiltration as described above without precipitation. The following properties were noted.

|  | pH | Conductivity 75° F., mmhos/cm. | Solids |
|---|---|---|---|
| Base adjusted rinse | 10.1 | 660 | 0.6 |
| Concentrate | 9.9 | 1,560 | 4.5 |
| Filtrate | 10.1 | 570 | 0 |

The filtrate was utilized to rinse additional electrocoated steel panels. No discernible difference in appearance was noted compared to deionized water.

The concentrate, a stable dispersion, was returned to the electrodeposition bath. No discernible difference was noted in the steel panels coated from the bath after addition as compared to panels coated before addition.

EXAMPLE II

The vehicle resin in this example is a maleinized tall oil fatty acid-adipic acid ester of a styrene-allyl alcohol copolymer of 1100 molecular weight and 5 hydroxyl functionality (Shell X-450) comprising 39.7 percent X-450, 52.9 percent tall oil fatty acids, 1.3 percent adipic acid and 6.1 percent maleic anhydride as a 90 percent solids solution in 4-methoxy-4-methylpentanone-2 having a viscosity of 36,700 centipoises and an acid value of 38.2. The electrodeposition primer had a composition:

|  | Percent |  |
|---|---|---|
| Non-volatiles |  | 100 |
| Vehicle non-volatiles |  | 87.35 |
| Allylethyl of methylolated phenol | 7.63 |  |
| 20% maleinized linseed oil (grinding vehicle) | 5.82 |  |
| Vehicle resin (above) | 85.10 |  |
| Surfactant (combination nonionic surfactant oil-soluble sulfonate—Witco 912) | 0.60 |  |
| Cresylic acid | 9.85 |  |
| Pigment |  | 12.65 |
| Red iron oxide | 17.05 |  |
| Anthracite coal | 57.65 |  |
| Bentone 11 (a montmorillonite clay modified with the trimethyl-octyl ammonium ion and containing 0.65% nitrogen) | 1.75 |  |
| Strontium chromate | 3.30 |  |
| Lead silicate | 14.52 |  |
| Manganese dioxide | 5.78 |  |
| Organic solvent | 4-methoxy-4-methylpentanone-2 in 20/80 ratio to vehicle resin (above). |  |
| Amine | 1/4 diethyl/triethylamine. |  |

The composition was diluted to 11 percent solids with deionized water.

Phosphatized steel panels were coated at 250 volts for 2 minutes (75° F.). These panels were rinsed with deionized water and the dragout-containing rinse was collected. Triethyl amine was added to raise the pH of the rinse to 9.0 and the rinse water ultrafiltered as in Example I.

The filtrate was utilized to rinse additional electrocoated steel panels. No discernible difference in appearance was noted compared to deionized water rinse.

The concentrate, a stable dispersion, was returned to the electrodeposition bath. No discernible difference was noted in the steel panels coated from the bath after addition as compared to panels coated before addition.

EXAMPLE III

The vehicle resin of this example is an acrylic resin comprising 55 percent butyl acrylate, 25 percent styrene, 15 percent methacrylic acid, and 5 percent hydroxyethyl methacrylate. The polymer was utilized as a 74 percent solids solution in butyl Cellosolve (the monobutyl ether of ethylene glycol). The resin had a viscosity of 128,000 centipoises and an acid value of 68.2.

The electrodeposition bath had the following composition:

| Composition: | Parts by wt. |
|---|---|
| Vehicle resin (above) | 223 |
| Ethoxymethoxymethyl melamine (XM1116) | 42 |
| Diisopropanolamine | 24 |
| Deionized water | 35 |

The bath contained 5.5 percent solids, with a pH of 8.8 and had a specific conductivity at 77° F. of 490 mmhos.

Tin-free steel panels were coated from this bath and the dragnut material was collected by rinsing with deionized water and collecting the rinse water. The panels were coated at a bath temperature of 80° F. at 300 volts for 5 seconds.

The dragout-containing rinse water containing 0.52 percent solids was subjected to ultrafiltration as described in Example I. A total of 10,000 parts of rinse water were treated. The rinse water was ultrafiltered to a point where the solids of the retentate was 5 percent. The retentate was returned to the electrodeposition bath and panels were again coated. The reconstituted bath contained 5.2 percent solids with a pH of 8.6 and a specific conductivity at 77° F. of 52 mmhos./cm. Panels coated and baked under the same conditions as from the original bath showed no discernible difference in film thickness or properties. The ultrafiltrate was subsequently employed as a rinsing agent for electrodepositable panels and again so discernible difference was noted between panels rinsed with the deionized water or panels rinsed with the ultrafiltrate. Returning the dragout-containing ultrafiltrate rinse water to the electrodeposition bath affected neither bath stability nor thickness or properties of the subsequently coated panels.

Other electrodepositable compositions, such as those hereinafter described, may be substituted for those exemplified. Likewise, various other filter or membrane means may be employed to obtain the improvements hereinabove described.

According to the provisions of the Patent Statutes, there are described above the invention and what are now considered its best embodiments; however, within the scope of the appended claims, it is to be understood that the invention can be practiced otherwise than as specifically described.

We claim:

1. A method of treating electrodeposition rinse water which has been utilized to rinse an article electrocoated in an electrodeposition bath, and which contains dragout-derived solids content, said solids content comprising an ionically-solubilized synthetic organic resin, which comprises subjecting said rinse water to an ultrafiltration process wherein an ultrafiltration membrane passes an effluent comprising water and solute of substantially lower molecular size than said resin, while retaining said resin, and returning retentate of the ultrafiltration process to the electrodeposition process.

2. A method as in claim 1 wherein the ultrafiltration process operates at a pressure gradient between about 10 and about 150 p.s.i. and the ultrafiltration membrane has a flux rate of at least about 15 gallons per square foot per day.

3. A method of treating electrodeposition rinse water which has been utilized to rinse an article electrocoated in an electrodeposition bath, and which contains dragout-derived solids content, said solids content comprising an ionically-solubilized synthetic organic resin, which comprises subjecting said rinse water to an ultrafiltration process wherein an ultrafiltration membrane passes an effluent comprising water and solute of substantially lower molecular size than said resin, while retaining said resin, and returning retentate of the ultrafiltration process directly or indirectly to the electrodeposition bath.

4. A method as in claim 3 wherein the retentate is returned directly to the electrodeposition bath.

5. A method as in claim 3 wherein the retentate is returned to the electrodeposition bath by rinsing an electrocoated article with said retentate and returning the resultant rinse to the electrodeposition bath.

6. A method as in claim 3 wherein the effluent of the ultrafiltration process is employed as a rinsing agent for electrocated articles.

7. A method as in claim 6 wherein the ultrafiltration process operates at a pressure gradient between about 10 and about 150 p.s.i. and the ultrafiltration membrane has a flux rate of at least about 15 gallons per square foot per day.

8. A method as in claim 3 wherein the ultrafiltration process operates at a pressure gradient between about 10 and about 150 p.s.i. and the ultrafiltration membrane has a flux rate of at least about 15 gallons per square foot per day.

9. A method as in claim 8 wherein the resin is acid-solubilized synthetic polybasic resin.

10. A method as in claim 8 wherein the resin comprises base-solubilized synthetic polyacid resin.

11. A method as in claim 10 wherein the resin is a synthetic polycarboxylic acid resin.

12. A method as in claim 11 wherein the base is a water-soluble amine.

13. A method as in claim 11 wherein the base is potassium hydroxide.

14. A method as in claim 3 wherein the pH of the rinse water is adjusted to form a stable dispersion prior to ultrafiltration.

15. A method as in claim 14 wherein the ultrafiltration process operates at a pressure gradient between about 10 and about 150 p.s.i. and the ultrafiltration membrane has a flux rate of at least about 15 gallons per square foot per day.

16. A method as in claim 15 wherein the resin is a base-solubilized polyacid resin.

17. A method as in claim 16 wherein the base is water-soluble amine and where the pH is raised with water-soluble amine to at least about 8.0 prior to ultrafiltration.

18. A method as in claim 16 wherein the pH is adjusted with water-soluble base selected from the group consisting of water-soluble amines and potassium hydroxide.

19. A method as in claim 18 wherein the base is potassium hydroxide and where the pH is raised to at least about 0.8 with potassium hydroxide prior to ultrafiltration.

20. A method of treating electrodeposition rinse water which has been utilized to rinse an article electrocoated in an electrodeposition bath and which contains dragout-derived solids content, said solids content comprising an ionically-solubilized synthetic organic resin, which comprises collecting said rinse water in a receiver, subjecting at least a portion of said rinse water to an ultrafiltration process wherein an ultrafiltration membrane passes an effluent comprising water and solute of substantially lower molecular size than said resin, while retaining said resin, returning retentate of the ultrafiltration process to said receiver and subsequently utilizing at least a portion of the contents of said receiver as a rinsing agent in a manner such that the resultant rinse is returned to the electrodeposition bath.

21. A method as in claim 20 wherein the ultrafiltration process operates at a pressure gradient between about 10 and about 150 p.s.i. and the ultrafiltration membrane has a flux rate of at least about 15 gallons per square foot per day.

22. A method as in claim 21 wherein the pH of the contents of the receiver is adjusted to form a stable dispersion.

23. A method as in claim 21 wherein the resin is a base-solubilized synthetic polycarboxylic acid resin.

24. A method as in claim 23 wherein the pH is raised with a water-soluble amine or potassium hydroxide to a pH of at least 7.5.

25. A method as in claim 24 wherein the pH is raised to at least about 8.0.

References Cited
UNITED STATES PATENTS

| | | | |
|---|---|---|---|
| 3,526,588 | 9/1970 | Michaels et al. | 210—23 |
| 3,556,970 | 1/1971 | Wallace et al. | 204—181 |

HOWARD S. WILLIAMS, Primary Examiner

U.S. Cl. X.R.

210—23